United States Patent
Nelson et al.

(10) Patent No.: US 10,006,449 B2
(45) Date of Patent: Jun. 26, 2018

(54) BEARING ARRANGEMENT FOR CRYOGENIC PUMP

(71) Applicant: Caterpillar Inc., Peoria, IL (US)

(72) Inventors: Bryan E. Nelson, Chillicothe, IL (US); Daniel R. Baldwin, Peoria, IL (US); Alan R. Stockner, Metamora, IL (US); Robert M. Campion, Chillicothe, IL (US); Cory A. Brown, Peoria, IL (US); Joshua W. Steffen, El Paso, IL (US); Dana R. Coldren, Secor, IL (US); Sana Mahmood, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 725 days.

(21) Appl. No.: 14/597,019

(22) Filed: Jan. 14, 2015

(65) Prior Publication Data
US 2016/0201659 A1   Jul. 14, 2016

(51) Int. Cl.
| F04B 27/10 | (2006.01) |
| F04B 37/08 | (2006.01) |
| F16C 19/30 | (2006.01) |
| F16C 23/08 | (2006.01) |
| F16C 19/54 | (2006.01) |
| F16C 19/06 | (2006.01) |

(52) U.S. Cl.
CPC ...... *F04B 27/1054* (2013.01); *F04B 27/1063* (2013.01); *F04B 37/08* (2013.01); *F16C 19/30* (2013.01); *F16C 23/086* (2013.01); *F16C 19/06* (2013.01); *F16C 19/547* (2013.01); *F16C 2360/00* (2013.01)

(58) Field of Classification Search
CPC .......... Y10T 74/18336; F04B 27/1054; F04B 37/08; F04B 27/1063; F16C 23/086; F16C 19/30
See application file for complete search history.

(56) References Cited

U.S. PATENT DOCUMENTS

| 2,016,802 A | 10/1935 | Fick |
| 3,663,122 A | 5/1972 | Kitchen |
| 4,169,397 A | 10/1979 | Vehling et al. |
| 4,495,855 A * | 1/1985 | Murakami ............... F01B 3/02 417/269 |
| 4,523,898 A | 6/1985 | Martin et al. |

(Continued)

FOREIGN PATENT DOCUMENTS

| DE | 10112501 A1 | 9/2002 |
| GB | 717767 A | 11/1954 |

(Continued)

*Primary Examiner* — F. Daniel Lopez
*Assistant Examiner* — Abiy Teka
(74) *Attorney, Agent, or Firm* — Leydig, Voit & Mayer, Ltd.; John Wappel

(57) ABSTRACT

A bearing arrangement for a wobble plate piston pump includes first, second, third, and fourth bearing assemblies. The first and second bearing assemblies support the drive shaft portion for rotation within the housing about the central longitudinal axis, while the third and fourth bearing assemblies support the load plate for rotation relative to the offset shaft portion of the shaft. The second bearing assembly is distally disposed from the first, the third disposed distally to second, and the fourth disposed distally to third. The fourth bearing assembly is the most distally disposed bearing assembly along the shaft.

18 Claims, 2 Drawing Sheets

(56) References Cited

U.S. PATENT DOCUMENTS

| | | |
|---|---|---|
| 4,528,965 A | 7/1985 | Gibson et al. |
| 4,530,331 A | 7/1985 | Gibson et al. |
| 4,531,492 A | 7/1985 | Gibson |
| 4,531,494 A | 7/1985 | Bailey et al. |
| 4,541,391 A | 9/1985 | Gibson |
| 4,554,901 A | 11/1985 | Gibson et al. |
| 4,557,237 A | 12/1985 | Bally et al. |
| 4,792,287 A | 12/1988 | Alaze et al. |
| 4,802,826 A | 2/1989 | Hall |
| 4,910,846 A | 3/1990 | Andreasson et al. |
| 5,415,077 A | 5/1995 | Ono |
| 5,490,444 A | 2/1996 | Claas |
| 5,545,015 A | 8/1996 | Scherrer |
| 5,826,488 A | 10/1998 | Arai et al. |
| 5,916,348 A | 6/1999 | Lanfredi |
| 6,138,549 A | 11/2000 | Braun et al. |
| 6,318,238 B1 | 11/2001 | Becker et al. |
| 6,481,218 B1 | 11/2002 | Drelser |
| 6,517,331 B1 | 2/2003 | Gibson et al. |
| 6,572,344 B1 | 6/2003 | Hajek, Jr. et al. |
| 6,880,450 B2 | 4/2005 | Stölzer |
| 6,901,911 B2 | 6/2005 | Anderson et al. |
| 7,302,883 B2 | 12/2007 | Lynn et al. |
| 7,428,812 B2 | 9/2008 | Montiminy et al. |
| 2009/0165640 A1 | 7/2009 | Kawasaki et al. |
| 2014/0053800 A1 | 2/2014 | Steffen et al. |
| 2014/0186196 A1 | 7/2014 | Mizoguchi et al. |

FOREIGN PATENT DOCUMENTS

| | | |
|---|---|---|
| JP | 03-33480 A | 2/1991 |
| WO | WO 88/03227 A1 | 5/1988 |
| WO | WO 94/03708 A1 | 2/1994 |

\* cited by examiner

BEARING ARRANGEMENT FOR CRYOGENIC PUMP

TECHNICAL FIELD

The present disclosure relates generally to cryogenic pumps and, more particularly, to a bearing arrangement for supporting a wobble shaft in a cryogenic pump.

BACKGROUND

Some applications require the handling, and, more particularly, the pumping of cryogenic liquids. For example, heavy machines like locomotives or large mining trucks may have engines that use more than one fuel. The engine may be a dual fuel engine system, in which a gaseous fuel, such as compressed natural gas, is injected into a cylinder at high pressure while combustion in the cylinder from a diesel pilot is already underway. With such engines, the gaseous fuel is stored in a liquid state at a low pressure, such as atmospheric pressure, and at low, cryogenic temperatures in a storage tank in order to achieve a higher storage density. However, the use of such a cryogenic fuel requires the use of specialized equipment, including a cryogenic tank for storing the liquefied natural gas ("LNG") fuel and a cryogenic pump for withdrawing and pressurizing the liquefied natural gas fuel.

Dual fuel engines (natural gas+diesel) require high injection pressure of the natural gas to achieve significant greenhouse gas reduction benefits. The most efficient way to generate high-pressure natural gas is to pump it to pressure in liquid form and then heat it. The cryogenic temperatures associated with LNG require highly specialized pump design features. Current designs of high-pressure LNG pumps utilize reciprocating piston pumps which are driven by a crank-slider mechanism. The crank slider mechanisms are large, heavy, and challenging to package on a vehicle.

Wobble shaft pumps have been used in hydraulic and fuel system applications for many years and served their respective industries well. Such a pump is disclosed, for example, in PCT Publication WO 94/03708, which utilized five roller bearing assemblies in support of a rotating shaft. Typical wobble plate pump designs use ball, cylindrical, and tapered roller bearings to carry the axial and radial loads produced by the pumping action. Over the years as pump displacements and pressures have increased so have the loads placed on the wobble plate bearings. Additionally the desire for greater power density has limited the envelope in which the pump and its associated bearings must fit. Ball bearings, while adequate for limited life or light load applications, simply do not have the load capacity to provide the required life of heavy-duty machines and engines, where 10,000-20,000 hour life is the norm. Cylindrical thrust bearings have good capacity, but in thrust applications, the rollers skid across the upper and lower raceways, eventually leading to bearing failure. Tapered roller bearings have good life, but due to their design tend to result in overly large dimensions and are therefore difficult to package. To date, however, commercially available pumps do not support the high loads while providing desirable bearing life in a relatively compact package.

SUMMARY

In one aspect, the present disclosure describes a bearing arrangement for a wobble plate piston pump having a proximal end for coupling to a drive input, and a distal end. The pump includes a shaft disposed to rotate within a housing about a central longitudinal axis. The shaft includes a proximally-disposed drive shaft portion and a distally-disposed offset shaft portion. The drive shaft portion has a shaft axis disposed along the central longitudinal axis. The offset shaft portion includes a wobble plate surface and a cap having a wobble plate axis disposed at an angle to the central longitudinal axis. The pump further includes a load plate disposed for rotation relative to the shaft about the wobble plate axis. The bearing arrangement includes first, second, third, and fourth bearing assemblies. The first bearing assembly supports the drive shaft portion for rotation within the housing about the central longitudinal axis. The second bearing assembly supports the drive shaft portion for rotation within the housing about the central longitudinal axis, and is distally disposed from the first bearing assembly. The third bearing assembly supports the load plate for rotation relative to the shaft, and is disposed distally to second bearing assembly. The fourth bearing assembly supports the load plate for rotation relative to the shaft, and is disposed distally to third bearing assembly. The fourth bearing assembly is the most distally disposed bearing assembly along the shaft.

In another aspect, the present disclosure describes a bearing arrangement for wobble plate piston pump having a proximal end for coupling to a drive input, and a distal end. The pump includes a shaft disposed to rotate within a housing about a central longitudinal axis. The shaft includes a proximally-disposed drive shaft portion and a distally-disposed offset shaft portion. The drive shaft portion has a shaft axis disposed along the central longitudinal axis. The offset shaft portion includes a wobble plate surface and a cap having a wobble plate axis disposed at an angle to the central longitudinal axis. The pump further includes a load plate disposed for rotation relative to the shaft about the wobble plate axis. The load plate has a center of nutation. The bearing arrangement includes first, second, third and fourth bearing assemblies. The first bearing assembly supports the drive shaft portion for rotation within the housing about the central longitudinal axis, and has a first load center disposed along the central longitudinal axis. The second bearing assembly is disposed along the central longitudinal axis and supports the drive shaft portion for rotation within the housing about the central longitudinal axis. The second bearing assembly is disposed distally to the first bearing assembly. The third bearing assembly supports the load plate for rotation relative to the shaft, and is disposed distally to second bearing assembly. The third bearing assembly includes a third load center disposed radially from the central longitudinal axis. The fourth bearing assembly supports the load plate for rotation relative to the shaft, and is disposed distally to the third bearing assembly. The fourth bearing assembly has a fourth load center substantially disposed along the center of nutation. The third load center is disposed longitudinally approximately midway between the first and fourth load centers.

In yet another aspect, the present disclosure describes a cryogenic pump configured for pressurizing a cryogenic fluid. The cryogenic pump includes a cold end portion and a warm end portion. The cold end portion is adapted to contact cryogenic fluid during operation of the pump and includes a pump inlet and a pump outlet. The warm end portion is adapted to not contact cryogenic fluid during operation of the pump. The warm end portion has a proximal end for coupling to a drive input, and a distal end disposed toward the cold end portion. The warm end portion includes a housing, a shaft disposed to rotate within the housing about a central longitudinal axis, a load plate, a plurality of force transmission elements, and first, second, third and fourth bearing assemblies. The shaft includes a proximally-disposed drive shaft portion and a distally-disposed offset shaft portion. The drive shaft portion has a shaft axis disposed along the central longitudinal axis. The offset shaft portion includes a wobble plate surface and a cap having a wobble plate axis disposed at an angle to the central longitudinal axis. The load plate disposed for rotation relative to the shaft about the wobble plate axis. The force transmission elements are slidably disposed to transmit axial force from the load plate to the cold end portion. The first bearing assembly supports the drive shaft portion for rotation within the housing about the central longitudinal axis. The second bearing assembly supports the drive shaft portion for rotation within the housing about the central longitudinal axis, and is disposed distally to the first bearing assembly. The third bearing assembly supports the load plate for rotation relative to the shaft, and is disposed distally to second bearing assembly. The fourth bearing assembly supports the load plate for rotation relative to the shaft, and is disposed distally to third bearing assembly. The fourth bearing assembly is the most distally disposed bearing assembly along the shaft.

DETAILED DESCRIPTION

Figure 1:
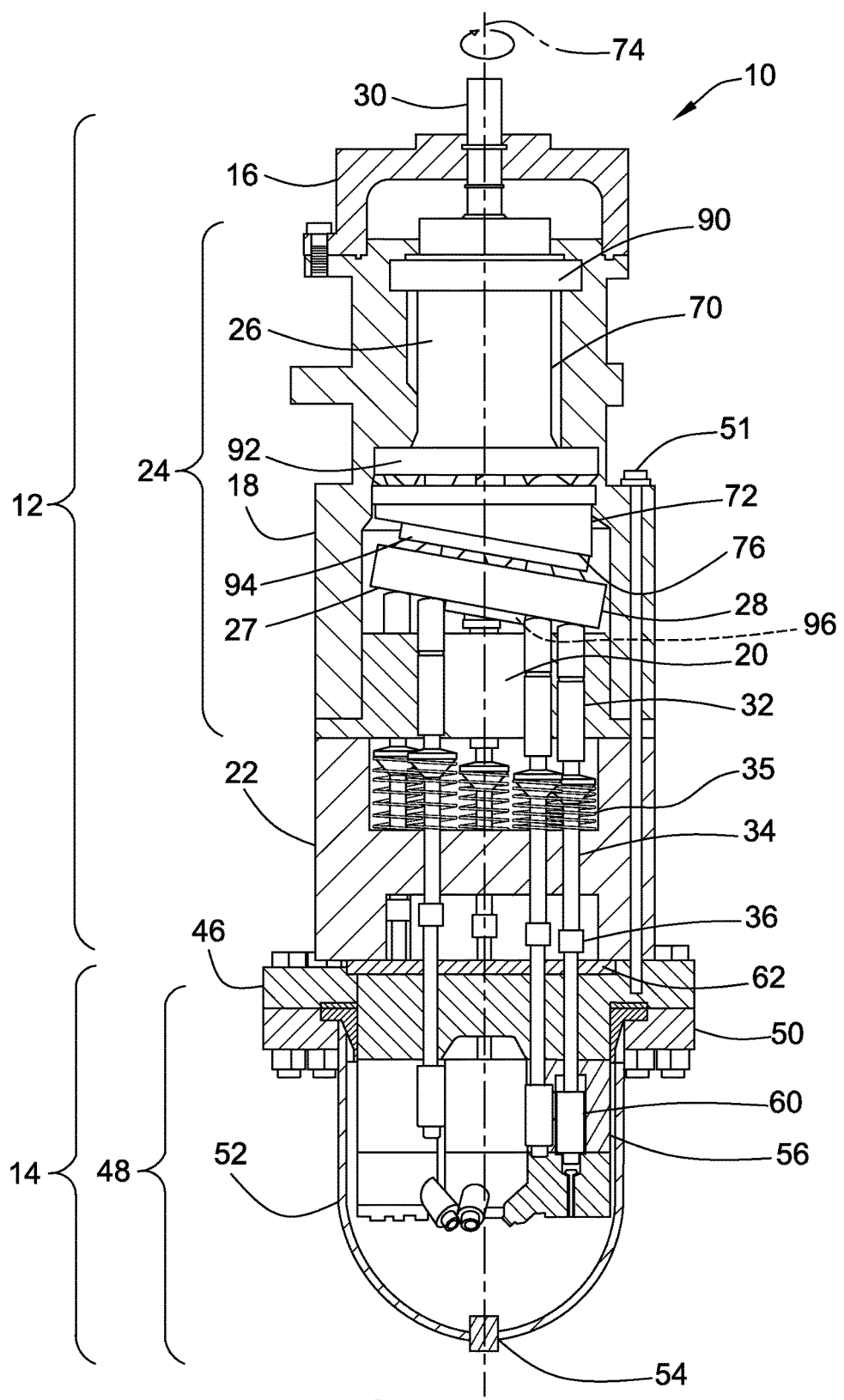
FIG. 1 is a partially cross-sectioned side view of an exemplary cryogenic pump according to the present disclosure partially cross-sectioned.

This disclosure generally relates to a pump 10 for high injection pressure fuel injection systems, such as liquid natural gas fuel injection systems. With reference to FIG. 1 of the drawings, an exemplary pump 10 according to the present disclosure is shown. The pump 10 of FIG. 1 may be configured to pump fluids at cryogenic temperatures, such as temperatures of less than minus 100 degrees Celsius. In one exemplary application, the pump 10 can be configured as a pump for drawing LNG from a tank, pressurizing it, and delivering it to an engine at high pressure. LNG is normally stored at temperatures of between about minus 240 degrees F. (minus 150 degrees C.) and minus 175 degrees F. (minus 115 degrees C.) and at pressures of between about 15 and 200 psig (103 and 1379 kPa) in a cryogenic tank. The engine, for example, may be on a machine such as a large mining truck or a locomotive. The high pressure LNG from the cryogenic pump may be vaporized into a gaseous form by a heat exchanger before it is introduced into the engine. Those skilled in the art will appreciate that the pump 10 of the present disclosure is not limited to applications involving the pumping of LNG or, more particularly, engine fuel delivery systems. Instead, the pump 10 of the present disclosure can be used in any application involving the pumping of a cryogenic liquid or the pumping of liquids at high pressures. The arrangement may likewise utilize a transfer pump supplying flow and pressure from a main tank.

With reference to FIG. 1 of the drawings, the pump 10 may be generally configured with a warm end portion 12 and a cold end portion 14. In the illustrated embodiment, the cold end portion 14 of the pump 10 is the lower portion of the pump and generally includes the pump components that are intended to come into contact with the cryogenic fluid during operation of the pump including a pump inlet and a pump outlet. The warm end portion 12 of the illustrated pump is the upper portion of the pump and generally includes one or more driving components of the pump that are not intended to contact the cryogenic fluid during operation of the pump. The components in the cold end portion 14 of the pump 10 may be constructed of materials rated for cryogenic service, while the components in the warm end portion 12 may be constructed of conventional materials.

With reference to FIG. 1, the warm end portion 12 of the pump may include a housing cap 16, a bearing housing 18, a tappet housing 20 and a pushrod housing 22. It will be appreciated that the housing arrangement is exemplary, and one or more of the housings 16, 18, 20 may have structures other than as illustrated. For example, the bearing housing 18 may be formed of two or more bearing housing portions (not illustrated). Similarly, while separate housings 18, 20, 22 are illustrated, a single housing may be provided. Starting from the upper end of the pump 10 as shown in FIG. 1, the housing cap 16 may be connected to an upper end of the bearing housing 18, while a lower end of the bearing housing 18 is connected to the tappet housing 20. The lower end of the tappet housing 20 may, in turn, be connected to the pushrod housing 22, which, in the illustrated embodiment, defines the lower end of the warm end portion 12 of the pump 10.

As further shown in FIG. 1, a rotatable shaft 26 and a load plate 28 may be contained within the bearing housing 18. The rotatable shaft 26 may be connected at its upper end to a stub shaft 30 that protrudes outward from the housing cap 16. The stub shaft 30 may be operatively coupled to any suitable prime mover capable of producing a rotary output such as, for example, an electric or hydraulic motor or a diesel or gasoline engine. In at least one embodiment, for example, the prime mover may be a reciprocating dual fuel compression ignition engine operating on a combination of LNG and a petroleum distillate, such as diesel fuel.

The shaft 26 includes a drive shaft portion 70 and an offset shaft portion 72, the drive shaft portion 70 being proximally disposed relative to the stub shaft 30 and the offset shaft portion 72 being distally disposed. The shaft 26 may be supported for rotation about a central longitudinal axis 74 within the bearing housing 18 by a bearing arrangement 24 that may include various bearings assemblies, as will be explained in greater detail below.

At the end opposite the stub shaft 30, in this case the distal or lower end, the shaft 26 may be operatively connected to the load plate 28 so as to drive movement thereof. In the illustrated embodiment, the load plate 28 may be supported on the offset shaft portion 72 and within the bearing housing 18 for wobbling movement about the center of the load plate 28, that is, about a wobble plate axis 148 (see FIG. 2). The shaft 26 may be operatively connected to the load plate 28 in such a manner that rotation of the shaft 26 drives the wobbling movement of the load plate 28 as the shaft 26 rotates relative to the load plate 28. The load plate 28 includes a distal contact surface 27. As the load plate 28 rocks in response to the rotation of the shaft 26, the distal contact surface 27 defines a center of nutation 29 (see FIG. 2).

Returning to FIG. 1, a plurality of tappets 32 may be arranged immediately beneath the load plate 28, with an upper end of each tappet 32 in contact with the contact surface 27 of the load plate 28. While five tappets 32 are visible in the cross-section of FIG. 1, it will be understood that additional tappets 32 may be provided. Each of the tappets 32 may have an elongate configuration and be supported for longitudinal movement in a respective passage in the tappet housing 20. The movement of the tappets 32 may be driven by the load plate 28. More specifically, the load plate 28 may be supported at a transverse angle relative to the longitudinal axis 74 of the pump 10 such that wobbling movement of the load plate 28 drives reciprocal movement of the tappets 32.

A lower end of each tappet 32 may engage a corresponding upper pushrod 34 that, in turn, engages at its lower end a corresponding lower push rod 36. In the cross-sectional view of FIG. 1, a total of five upper and lower pushrod 34, 36 pairs are visible. However, it will be understood that a respective upper and lower pushrod 34, 36 pair may be provided for each tappet 32. Each upper pushrod 34 may be supported in the pushrod housing 22 for movement in the longitudinal direction of the pushrod 34 in response to a force applied at the upper end thereof by the tappet 32. To this end, each upper pushrod 34 may be received in a corresponding opening in the pushrod housing 22. The longitudinal movement of the upper pushrods 34, in turn, applies a force on the lower pushrods 36 that drives movement of the respective lower pushrod 36 in the longitudinal direction. In this case, downward or distal movement of each tappet 32 and upper pushrod 34 may be counter to the force of a respective spring 35 arranged, for example, in a cavity of the pushrod housing 22 to drive the upper pushrod 34 and tappet 32 back upward when the force applied by the load plate 28 is relieved by rotation of the plate.

The cold end portion 14 of the pump 10 may include a manifold 46 and a reservoir 48. For the sake of clarity, all of the details of the internal structure of the cold end portion 14 of the pump 10 are not illustrated in the exemplary embodiment. For example, the internal structure of the manifold 46 is not illustrated in detail inasmuch as it is not pertinent to the present disclosure. It will be appreciated, however, that an intake may be provided through the manifold 46 to allow an opening for cryogenic fluid, e.g., LNG, to enter. It will further be appreciated that, while further explanation is provided relative to the reservoir 48, a portion of the cold end portion 14 may be submerged into a tank. In the specific illustrated embodiment, the manifold 46 may be arranged at the lower end of the pushrod housing 22, while the reservoir 48 may be attached to the lower side of the manifold 46. To facilitate connection between the manifold 46 and the reservoir 48, the reservoir 48 may have an annular retainer 50 at the upper end thereof that abuts against an outer portion of the lower surface of the manifold 46 and is secured thereto, for example, by fasteners. The manifold 46, in turn, may be connected to the pushrod housing 22 by one or more tie rods 51 (one is shown in FIG. 1) that extend through the bearing housing 18, the tappet housing 20 and the pushrod housing 22 and into the manifold 46.

The reservoir 48 may include a outer vacuum jacket 52 that has an opening 54 at its lower end to allow for cryogenic fluid, e.g. LNG, to enter into the reservoir 48. In the illustrated embodiment, the reservoir 48 may further house a plurality of barrels 56 each of which defines an inlet for the pump 10. According to one embodiment, at least a portion of the barrel 56 may be submerged in cryogenic fluid contained in the reservoir 48. Generally, each barrel 56 corresponds to a respective one of the tappet and pushrod combinations. Thus, while three barrels 56 are visible in the cross-sectional view of FIG. 1, it will be understood that the pump 10 includes five barrels in the illustrated embodiment, and may have, for example, any number of barrels as well as corresponding tappet and pushrod combinations.

Each lower pushrod 36 may extend downward through a corresponding passage through the manifold 46 and into a corresponding one of the barrels 56 where it engages with a plunger 60 arranged in the barrel 56. With this arrangement, movement of the lower pushrod 36 (as driven by the load plate 28 through the corresponding tappet 32 and upper pushrod 34) can drive movement of the plunger 60. The upper and lower pushrods 34, 36 are shown here for illustrative purposes. Those skilled in the art will appreciate that any number of pushrod elements could be used between each tappet 32 and its corresponding plunger 60, including an arrangement where the tappet 32 and plunger 60 are operably disposed or connected to each other.

Movement of the plunger 60, in turn, draws the cryogenic fluid into the barrel 56 and pressurizes it. The pressurized cryogenic fluid may then be directed into the manifold 46 which defines the outlet for the pressurized fluid from the pump 10. To help limit the transfer of heat from the warm end portion 12 of the pump 10 to the cold end portion 14, the pump 10 may include an insulating arrangement 62 arranged between the warm and cold end portions 12, 14 of the pump 10.

Figure 2:
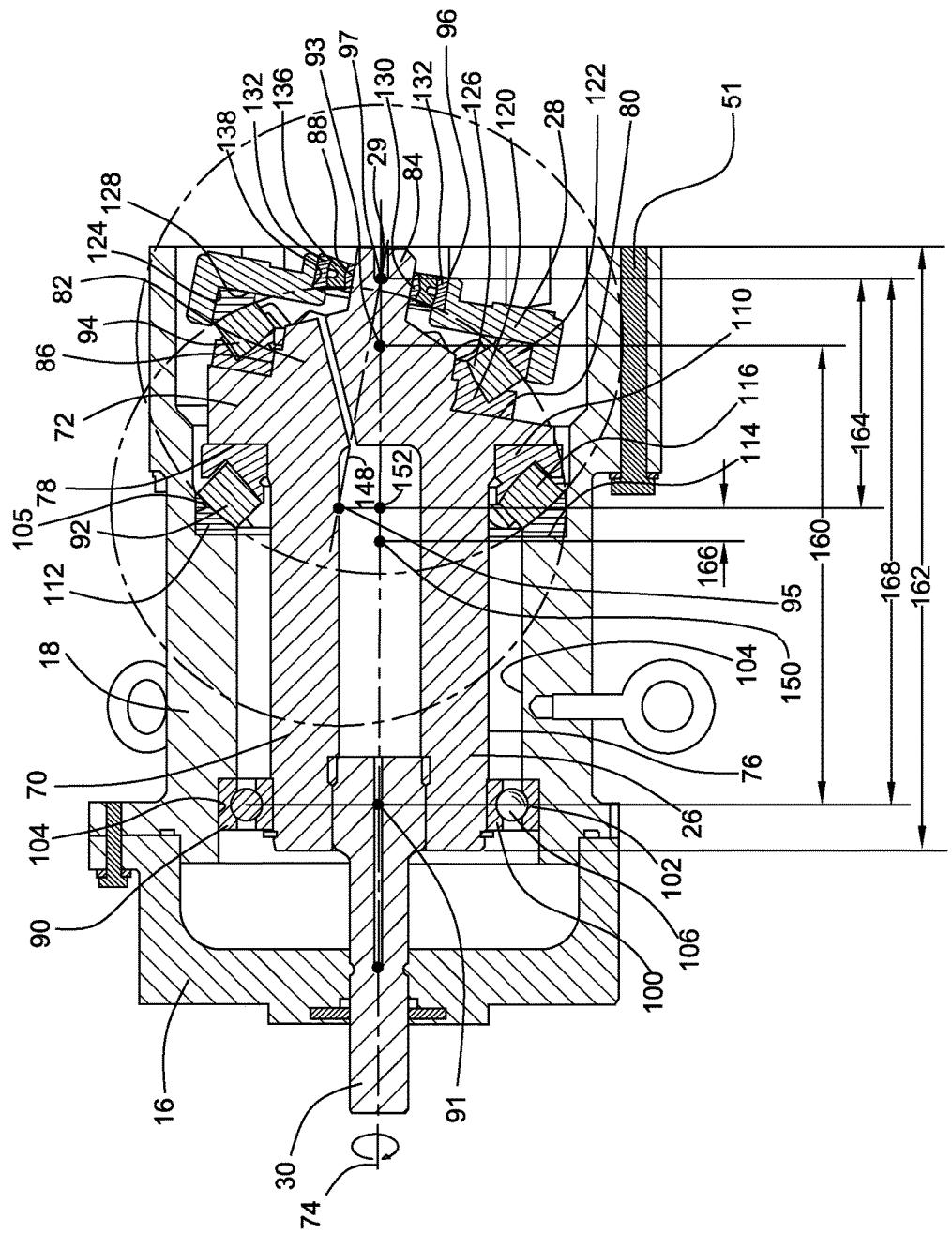
FIG. 2 is an enlarged fragmentary side cross-sectional view of a driver subassembly of the cryogenic pump of FIG. 1.

Turning now to FIG. 2, the bearing arrangement 24 is illustrated in greater detail. The drive shaft portion 70 of the shaft 26 has an elongated cylindrical structure with a generally annular outer surface 76, and may be hollowed in order to minimize weight. The drive shaft portion 70 includes a proximal end disposed toward the stub shaft 30 and a distal end disposed away from the stub shaft 30. The drive shaft portion 70 includes a shaft axis disposed along the central longitudinal axis 74.

The offset shaft portion 72 is includes a proximal surface 78 that extends substantially radially outward from the annular outer surface 76 at the distal end of the drive shaft portion 70. The offset shaft portion 72 further includes a distal surface 80 that is disposed at an oblique angle to the central longitudinal axis 74. As may be seen in FIG. 2, the distal surface 80 further extends at an acute angle to the proximal surface 78. The offset shaft portion 72 further includes a cap 82 from which an axle 84 extends, the cap 82 extending normally from the distal surface 80. The cap 82 includes at least one annular outer surface 86, and the axle 84 includes at least one annular outer surface 88. Accordingly, the cap 82 and the distal surface 80 the offset shaft portion 72 define the wobble plate axis 148 disposed at an angle to the central longitudinal axis 74.

It will be appreciated by those of skill in the art that the large, off-centered mass of the offset shaft portion 72 will create unresolved forces during rotation of the shaft 26. The bearing arrangement 24 according to this disclosure may substantially resolve those forces developed during rotation of the shaft 26.

The bearing arrangement 24 includes a plurality of bearing assemblies 90, 92, 94, 96. The shaft 26 is mounted for rotation about the central longitudinal axis 74 within the bearing housing 18 by a first bearing assembly 90 disposed about the drive shaft portion 70, and a second bearing assembly 92 disposed about the drive shaft portion 70 adjacent the proximal surface 78 of the offset shaft portion 72. The load plate 28 is mounted for rotation relative to the offset shaft portion 72 rotating with the drive shaft portion 70 by a third bearing assembly 94 disposed between the load plate 28, the distal surface 80 of the offset shaft portion 72 and the annular outer surface 86 of the cap 82 of the offset shaft portion 72, and by a fourth bearing assembly 96 disposed between the load plate 28 and the axle 84 of the cap 82 of the offset shaft portion 72.

The first bearing assembly 90 is disposed about the proximal end of the drive shaft portion 70 of the shaft 26. According to a feature of the disclosed bearing arrangement 24, the first bearing assembly 90 experiences generally only radially forces as the shaft 26 rotates within the bearing housing 18. In the illustrated embodiment, the first bearing assembly 90 is a ball bearing assembly including an inner raceway 100 disposed against the annular outer surface 76 of the drive shaft portion 70, an outer raceway 102 disposed against an inner surface 104 of the drive housing 18, and a plurality of ball bearings 106 disposed for rotation between the inner and outer raceways 100, 102. Thus, the first bearing assembly 90 may be chosen to include a first load center 91 that is disposed along the longitudinally extending axis 74, at the radial center of the of the first bearing assembly 90. A ball bearing assembly in this position may provide good durability characteristics for the forces applied, provide a compact package, and be economically incorporated into the design. An alternate type of bearing assembly may be utilized in this position, however, so long as it exhibits good durability characteristics for the forces applied.

According to another feature of the disclosed bearing arrangement 24, the second and third bearing assemblies 92, 94 are thrust bearings disposed in opposed relationship to one another along either side of the offset shaft portion 72. In the illustrated embodiment, the second and third bearing assemblies 92, 94 are spherical thrust bearings. In each, the inner raceway 110, 120 is disposed, in part, against the offset shaft portion 72.

In the second bearing assembly 92, the inner raceway 110 is disposed against the proximal surface 78 of the offset shaft portion 72 and the annular outer surface 76 of the drive shaft portion 70. The outer raceway 112 is disposed against a ledge 114 in the annular inner surface 104 of the bearing housing 18 at 105. A plurality of spherical bearings 116 is disposed between the inner and outer raceway 110, 112.

Similarly, in the third bearing assembly 94, the inner raceway 120 is disposed against the distal surface 80 of the offset shaft portion 72 and the annular outer surface 86 of the cap 82 of the offset shaft portion 72. The outer raceway 122 is disposed against a ledge 124 and an undersurface 128 of the load plate 28. A plurality of spherical bearings 126 is disposed between the inner and outer raceway 120, 122.

The second load center 93 of the second bearing assembly 92 is disposed along the central longitudinal axis 74, while the third load center 95 of the third bearing assembly 94 is disposed radially outward from the central longitudinal axis 74. It will thus be appreciated that the second and third bearing assemblies 92, 94 provide not only radially extending forces, but also opposed axially extending forces along either side of the offset shaft portion 72 during rotation.

The load plate 28 is further supported for relative rotation on the offset shaft portion 72 by the fourth bearing assembly 96 disposed distally from the third bearing assembly 94. It will be appreciated that the fourth bearing assembly 96 will exhibit only radial forces during the rotation about the central longitudinal axis 74. The fourth bearing assembly 96 includes an inner raceway 130 disposed about the annular outer surface 88 of the axle 84, and an outer raceway 132 disposed against a ledge 138 along the load plate 28. In the illustrated embodiment, the fourth load center 97 of the fourth bearing assembly 96 may be disposed at the center of nutation 29. In at least one embodiment, the load center 97 is disposed in a position slightly more distal than the center of nutation 29. In at least one embodiment, the load center 97 is disposed on the order of 7.5 mm from the center of nutation 29. For the purposes of this disclosure, the term "substantially" will refer to the disposition of the load center 97 at a position that is within 40 mm of the center of nutation 29. Further, in order to minimize the radial forces applied to the fourth bearing assembly 96, the fourth load center 97 may be disposed along the central longitudinal axis 74. A plurality of spherical bearings 136 is disposed between the inner and outer raceways 130, 132 of the fourth bearing assembly 96.

INDUSTRIAL APPLICABILITY

The bearing arrangement 24 of the present disclosure may be applicable to any wobble plate pump, and particularly those exhibiting high loading forces. In particular, the bearing arrangement of the present disclosure may be applicable to any type of cryogenic pumps having separate cold and warm end portions.

For example, the pump 10 of the present disclosure has particular applicability to the pumping of LNG at high pressures in fuel delivery systems for vehicles such as locomotives and large mining trucks. Some embodiments of the disclosed bearing arrangement 24 and pump 10 may be utilized with a reciprocating dual fuel compression ignition engine operating on a combination of liquid natural gas (LNG) and a petroleum distillate, such as diesel fuel.

According to an aspect of the disclosure, the rotation of the shaft 26 about the central longitudinal axis 74 may be supported by only four bearing assemblies. That is, the first and second bearing assemblies 90, 92 rotatably support the shaft 26 for rotation within the bearing housing 18, while the bearing assemblies 94, 96 support the load plate 28 for rotation relative to the shaft 26, the offset shaft portion 72 also providing a wobbling movement of the load plate 28 as the shaft 26 rotates. Thus, it will be appreciated that the first and second bearing assemblies 90, 92 are disposed about the drive shaft portion 70 proximally to the second and third bearing assemblies 94, 96, which are disposed for rotation of the load plate 28 relative to the shaft 26. In this way, the fourth bearing assembly 96 supporting the load plate 28 for rotation relative to the shaft 26 is the most distally disposed bearing assembly along the shaft 26.

A stable bearing arrangement 24 may be facilitated by the placement of the bearing assemblies 90, 92, 94, 96 along the shaft 26. In the illustrated embodiment, for example, the second load center 93 is disposed longitudinally closer to the fourth load center 97, than to the first and third load centers 91, 95. Further, the second load center 93 is disposed longitudinally closer to the fourth load center 97 than the third load center 95 is disposed longitudinally relative to the first load center 91.

In at least one embodiment, the respective first and second load centers 91, 93 of the first and second bearing assemblies 90, 92 are disposed a comparatively high distance from one another along the central longitudinal axis 74. In an embodiment, for example, the longitudinal distance 160 between the first and second load centers 91, 93 of the first and second bearing assemblies 90, 92 is at least two thirds of the longitudinal length 162 of the shaft 26. By way of further example, in the illustrated embodiment, the longitudinal distance 160 between the first and second load centers 91, 93 of the first and second bearing assemblies 90, 92 is on the order of three quarters of the longitudinal length 162 of the shaft 26.

In at least one embodiment, the respective the third and fourth load centers 95, 97 of the third and fourth bearing assemblies 94, 96 are disposed at a comparatively high longitudinal distance from one another. In other words, the third load center 95 of the third bearing assembly 94 is located longitudinally at point 152 along the central longitudinal axis 74. In an embodiment, for example, the longitudinal distance 164 between the third and fourth load centers 95, 97 of the third and fourth bearing assemblies 94, 96 is at least one third of the longitudinal length 162 of the shaft 26. By way of further example, in the illustrated embodiment, the longitudinal distance 164 between the third and fourth load centers 95, 97 of the third and fourth bearing assemblies 94, 96 is on the order of forty percent of the longitudinal length 162 of the shaft 26. Further, the nearer the third load center 95 of the third bearing assembly 94 to the longitudinal centerline of the shaft 26, the greater the stability.

In at least one embodiment, the third load center 95 of the third bearing assembly 94 may be disposed approximately midway longitudinally between the first and fourth load centers 91, 97 of the first and fourth bearing assemblies 90, 96. In other words, point 152 is approximately midway longitudinally between the first and fourth load centers 91, 97. The longitudinal central point between the first and fourth load centers 91, 97 is identified as central point 150 in FIG. 2. For the purposes of this disclosure, the term "approximately" in the context of the longitudinal location of the third load center 95 relative to the first and fourth load centers 91, 97 will be defined as the third load center 95 being longitudinally disposed at a longitudinal distance 166 from the central point 150 of no more than 10% of the total longitudinal distance 168 between the first and fourth load centers 91, 97.

Some embodiments of the bearing arrangement 24 in conjunction with a pump 10 may provide improved bearing assembly life. Further, some embodiments of the bearing arrangement 24 may provide a relatively compact package in conjunction with a high load pump 10. Thus, some embodiments may provide good bearing durability in a relatively compact package in a pump 10 that may accommodate relatively high loads for sustained periods.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A bearing arrangement for a wobble plate piston pump having a proximal end for coupling to a drive input, and a distal end, the pump including a shaft disposed to rotate within a housing about a central longitudinal axis, the shaft including a proximally-disposed drive shaft portion and a distally-disposed offset shaft portion, the drive shaft portion having a shaft axis disposed along the central longitudinal axis, the offset shaft portion including a wobble plate surface and a cap having a wobble plate axis disposed at an angle to the central longitudinal axis, the pump further including a load plate disposed for rotation relative to the shaft about the wobble plate axis, the bearing arrangement comprising:
    a first bearing assembly supporting the drive shaft portion for rotation within the housing about the central longitudinal axis,
    a second bearing assembly supporting the drive shaft portion for rotation within the housing about the central longitudinal axis, the second bearing assembly being disposed distally to the first bearing assembly,
    a third bearing assembly supporting the load plate for rotation relative to the shaft, the third bearing assembly being disposed distally to second bearing assembly, and
    a fourth bearing assembly supporting the load plate for rotation relative to the shaft, the fourth bearing assembly being disposed distally to third bearing assembly, the fourth bearing assembly being the most distally disposed bearing assembly along the shaft,
    wherein the first bearing assembly has a first load center disposed along the central longitudinal axis, the second bearing assembly has a second load center disposed along the central longitudinal axis, the third bearing assembly has a third load center, and the fourth bearing assembly has a fourth load center, the second load center being longitudinally disposed closer to the fourth load center than to the first and third load centers, and the second load center being longitudinally disposed closer to the fourth load center than the third load center is longitudinally disposed relative to the first load center.

2. The bearing arrangement of claim 1 wherein the second and third bearing assemblies are thrust bearings disposed in opposed relation to one another on opposed sides of the offset shaft portion.

3. The bearing arrangement of claim 1 wherein the load plate includes a distally facing contact surface defining a center of nutation, and the fourth bearing assembly has a fourth load center, the fourth load center being disposed substantially at the center of nutation.

4. The bearing arrangement of claim 3 wherein the fourth load center is disposed substantially along the central longitudinal axis.

5. The bearing arrangement of claim 3 wherein the fourth bearing assembly includes spherical roller bearings.

6. The bearing arrangement of claim 3 wherein the first bearing assembly has a first load center disposed along the central longitudinal axis, the third bearing assembly has a third load center disposed radially from the central longitudinal axis, and the third load center is disposed longitudinally approximately midway between the first and fourth load centers.

7. A bearing arrangement for a wobble plate piston pump having a proximal end for coupling to a drive input, and a distal end, the pump including a shaft disposed to rotate within a housing about a central longitudinal axis, the shaft including a proximally-disposed drive shaft portion and a distally-disposed offset shaft portion, the drive shaft portion having a shaft axis disposed along the central longitudinal axis, the offset shaft portion including a wobble plate surface and a cap having a wobble plate axis disposed at an angle to the central longitudinal axis, the pump further including a load plate disposed for rotation relative to the shaft about the wobble plate axis, the load plate having a center of nutation, the bearing arrangement comprising:
    a first bearing assembly supporting the drive shaft portion for rotation within the housing about the central longitudinal axis, the first bearing assembly having a first load center disposed along the central longitudinal axis, a second bearing assembly supporting the drive shaft portion for rotation within the housing about the central longitudinal axis, the second bearing assembly being disposed distally to the first bearing assembly, and including a second load center disposed along the central longitudinal axis, a third bearing assembly supporting the load plate for rotation relative to the shaft, the third bearing assembly being disposed distally to the second bearing assembly and including a third load center disposed radially from the central longitudinal axis, and a fourth bearing assembly supporting the load plate for rotation relative to the shaft, the fourth bearing assembly being disposed distally to the third bearing assembly and having a fourth load center substantially disposed along the center of nutation, the third load center being disposed longitudinally approximately midway between the first and fourth load centers, wherein the second load center is longitudinally disposed closer to the fourth load center than to the first and third load centers, and the second load center is longitudinally disposed closer to the fourth load center than the third load center is longitudinally disposed relative to the first load center.

8. The bearing arrangement of claim 7 wherein the second and third bearing assemblies are thrust bearings disposed in opposed relation to one another on opposed sides of the offset shaft portion.

9. The bearing arrangement of claim 7 wherein the fourth bearing assembly is the most distally disposed bearing assembly along the shaft.

10. The bearing arrangement of claim 7 wherein the fourth bearing assembly includes spherical roller bearings.

11. The bearing arrangement of claim 7 wherein the fourth load center being disposed substantially along the central longitudinal axis.

12. A cryogenic pump configured for pressurizing a cryogenic fluid, the cryogenic pump comprising:

a cold end portion adapted to contact cryogenic fluid during operation of the pump and including a pump inlet and a pump outlet, a warm end portion adapted to not contact cryogenic fluid during operation of the pump, the warm end portion having a proximal end for coupling to a drive input, and a distal end disposed toward the cold end portion, the warm end portion comprising:

a housing, a shaft disposed to rotate within the housing about a central longitudinal axis, the shaft including a proximally-disposed drive shaft portion and a distally-disposed offset shaft portion, the drive shaft portion having a shaft axis disposed along the central longitudinal axis, the offset shaft portion including a wobble plate surface and a cap having a wobble plate axis disposed at an angle to the central longitudinal axis, a first bearing assembly supporting the drive shaft portion for rotation within the housing about the central longitudinal axis, a second bearing assembly supporting the drive shaft portion for rotation within the housing about the central longitudinal axis, the second bearing assembly being disposed distally to the first bearing assembly, a third bearing assembly supporting the load plate for rotation relative to the shaft, the third bearing assembly being disposed distally to the second bearing assembly, a fourth bearing assembly supporting the load plate for rotation relative to the shaft, the fourth bearing assembly being disposed distally to the third bearing assembly, the fourth bearing assembly being the most distally disposed bearing assembly along the shaft, a load plate disposed for rotation relative to the shaft about the wobble plate axis, and a plurality of force transmission elements slidably disposed to transmit axial force from the load plate to the cold end portion; wherein the first bearing assembly has a first load center disposed along the central longitudinal axis, the second bearing assembly has a second load center disposed along the central longitudinal axis, the third bearing assembly has a third load center, and the fourth bearing assembly has a fourth load center, the second load center being longitudinally disposed closer to the fourth load center than to the first and third load centers, and the second load center being longitudinally disposed closer to the fourth load center than the third load center is longitudinally disposed relative to the first load center.

13. The cryogenic pump of claim 12 wherein the load plate includes a distally facing contact surface defining a center of nutation, and the fourth bearing assembly includes a fourth load center disposed substantially at the center of nutation.

14. The cryogenic pump of claim 13 wherein the fourth load center is disposed substantially along the central longitudinal axis.

15. The cryogenic pump of claim 13 wherein the fourth bearing assembly includes spherical roller bearings.

16. The cryogenic pump of claim 13 wherein the first bearing assembly has a first load center disposed along the central longitudinal axis, the third bearing assembly has a third load center disposed radially from the central longitudinal axis, and the third load center is disposed longitudinally approximately midway between the first and fourth load centers.

17. The cryogenic pump of claim 12 wherein the first bearing assembly has a first load center disposed along the central longitudinal axis, the second bearing assembly has a second load center disposed along the central longitudinal axis, the third bearing assembly has a third load center, and the fourth bearing assembly has a fourth load center, the second load center being longitudinally disposed closer to the fourth load center than to the first and third load centers, and the second load center being longitudinally disposed closer to the fourth load center than the third load center is longitudinally disposed relative to the first load center.

18. The cryogenic pump of claim 12 wherein the first bearing assembly has a first load center disposed along the central longitudinal axis, the second bearing assembly has a second load center disposed along the central longitudinal axis, the third bearing assembly has a third load center, and the fourth bearing assembly has a fourth load center, the third load center being disposed longitudinally approximately midway between the first and fourth load centers.

* * * * *